United States Patent [19]

Baumard

[11] 4,441,603

[45] Apr. 10, 1984

[54] SINGLE OR MULTIPLE HEAD FOR EXTRACTION OF BULK MATERIALS

[75] Inventor: Ulysse Baumard, Les Essarts, France

[73] Assignee: Etablissements Briand S.A., Les Herbiers, France

[21] Appl. No.: 317,907

[22] Filed: Nov. 3, 1981

[30] Foreign Application Priority Data

Nov. 4, 1980 [FR] France .................................. 80 23672

[51] Int. Cl.³ .............................................. B65G 65/16
[52] U.S. Cl. .................................... 198/518; 198/671; 198/676; 198/666
[58] Field of Search ............... 198/518, 558, 625, 671, 198/676, 658, 661, 662, 666

[56] References Cited

U.S. PATENT DOCUMENTS 2,751,203 6/1956 Compton ............................. 198/518
3,685,638 8/1972 Siwersson et al. .................. 198/671

Primary Examiner—Joseph E. Valenza
Assistant Examiner—Jonathan D. Holmes
Attorney, Agent, or Firm—Frost & Jacobs

[57] ABSTRACT

Apparatus for extracting bulk material and transferring it to a discharge device is disclosed. The apparatus comprises a housing with one or more cylindrical vertical sleeves receiving worms for feeding the bulk material to the discharge device. The worm is continued downwardly from the sleeves by a spiral helical flight rotatable with the worm. A conduit is defined between a vertical wall bounding the spiral helical flight outwardly and a central hub around which the spiral helical hub is coiled. A ledge connects the upper and lower parts of the extraction device formed by the worm and the spiral helical flight, and the spiral helical flight runs smoothly and uninterruptedly into the worm.

10 Claims, 5 Drawing Figures

4,441,603

SINGLE OR MULTIPLE HEAD FOR EXTRACTION OF BULK MATERIALS

FIELD OF THE INVENTION

The present invention relates to extraction apparatus operating in the midst of pasty, particulate or pulverulent bulk materials which are associated with discharge devices and used for extracting soil, sand, silt, grain, meal, petroleum products, nodules or any other bulk organic or mineral materials.

DESCRIPTION OF THE PRIOR ART

Such apparatus generally employ an extraction worm of the Archimedes' screw type, bucket conveyors or suction devices, the choice of the particular device being dictated by reasons of facility of use or efficiency. Whatever the device used it is generally disposed downstream of the tool for loosening or swelling the material to be extracted to facilitate takeover and transfer to the discharge device for loading or dumping. In some instances it is necessary to add a diluting means, particularly in the case of extracting silt or mud. Apparatus are also known in which the tool is disposed coaxially to a transfer worm. In such apparatus only the tool is set into rotation about the helical flight comprising the transfer device, or the tool and the transfer worm are both set into rotation, but in opposite directions, at different speeds or are separated by deflector devices. Generally speaking, these apparatus are relatively complex and have relatively high energy requirements.

OBJECT AND SUMMARY OF THE INVENTION

An object of the invention is to provide an extraction apparatus for simultaneous extraction from the midst of a pasty, particulate or pulverulent bulk material, with or without moisture, and transfer to an intake, manifold, thereafter the bulk material is compacted inside the manifold for continuous and augmented feeding of the discharge device for discharge to a loading or dumping station.

According to the invention there is provided an apparatus for simultaneous extraction of a pasty, particulate or pulverulent bulk material, with or without moisture, and transfer to an intake manifold where it is taken over for discharge to a loading or dumping station. The apparatus comprises a sheet material housing defining the intake manifold for the bulk material, the housing comprising at least one cylindrical sleeve having a vertical axis. An extraction device is provided having an upper and a lower part, the upper part comprising a worm rotatably mounted in the sleeve and having a diameter corresponding to that of the sleeve. The lower part comprises at least one spiral helical flight coiled around a central hub and extending from the lower end of the sleeve, a vertical wall laterally bounding the spiral helical flight, a conduit of closed section being defined between the central hub and the vertical wall for conveying the bulk material to the upper part of the extraction device. A ledge connects the upper and lower parts of the extraction device. The outer edge of the ledge being joined to the vertical walls and the spiral helical flight being integral with and joined uninterruptedly or smoothly to the worm.

According to a preferred embodiment:

the ledge has an upwardly extending cylindrical lip spaced inwardly from the vertical wall, the lip providing fluidtightness between the extraction device and the sleeve and centering the extraction device relative to the sleeve;

the conduit defined between the central hub and the vertical wall protrudes below the bottom of the housing;

and the sleeve or sleeves are extended by tangential portions for conveying and compacting the bulk material to a takeover zone of the discharge device.

The leading edge of the spiral helical flight extends subtantially radially and may comprise a beveled edge for facilitating the cutting of the bulk material. The incoming bulk material reaches the worm at the bottom of the housing defining the intake manifold to be conveyed inside the manifold to the discharge device of a known type, aided by lateral walls of the housing tangent to the cylindrical sleeve surrounding the worm of the upper part of the extraction device and directed toward the takeover zone of the discharge device.

BRIEF DESCRIPTION OF THE DRAWINGS

The accompanying drawings illustrate, by way of example, an embodiment of an apparatus in confirmity with the invention, comprising two extraction devices each having two spiral helical flights. In the drawings.

DETAILED DESCRIPTION OF THE PREFERRED EMBODIMENTS

Figure 1:
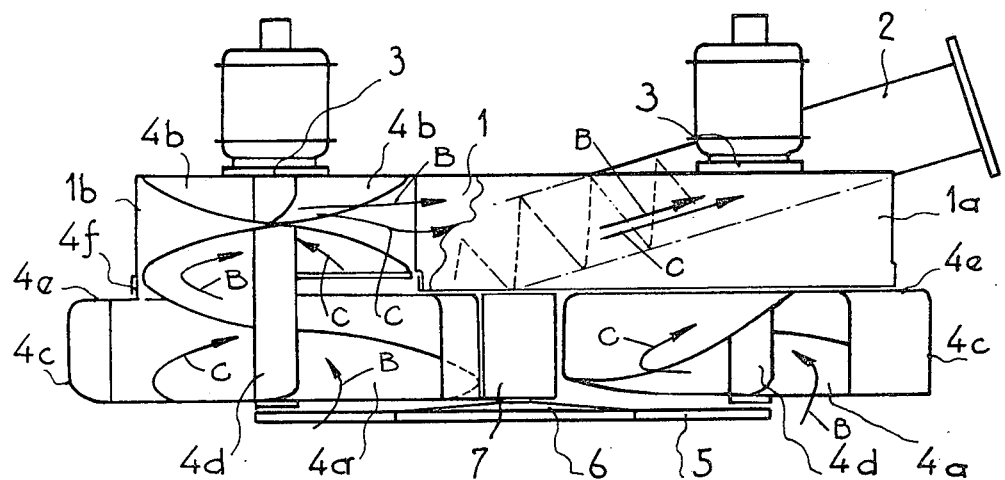
FIG. 1 is a partial elevational view in section of a first embodiment of the apparatus.

As illustrated, the apparatus comprises a housing 1 of sheet metal or other sheet material having good mechanical strength forming an enclosure defining a bulk material intake manifold. In the housing 1 is provided a known type of discharge device 2 such as a suction device or an Archimedes' screw as shown in the embodiment of drawings. The housing comprises two cylindrical sleeves 1*a* and 1*b* having vertical axes and interconnected tangentially by two sheet metal portions 1*c* and 1*d* for conveying the incoming bulk material to the takeover zone of the discharge device 2. In each one of the cylindrical sleeves 1*a*, 1*b* is mounted an extraction device 3 comprising, in the illustrated embodiments, two flights 4, each one of the flights having a lower part 4*a* of spiral helical configuration extending downward from the base of the sleeve, and an upper part 4*b* in continuation of the lower part 4*a* and comprising a simple helical screw or worm, the diameter of each worm corresponding to that of its sleeve 1*a*, 1*b*. The spiral helical flight is bounded laterally by a vertical wall 4*c* so as to define with the central hub 4*d* around which the spiral helical flight is coiled, a conduit of closed section through which the incoming bulk material is conveyed to the upper part 4*b*. The conduit is similar to a snail's shell with a truncated upper part. The upper and lower part 4*a*, 4*b* are connected by a horizontal or helical ledge 4*e*, with its outer edges being joined to the vertical walls 4*c*. A short cylindrical wall or lip 4*f* extends upwardly from the ledge 4*e* and has an inner diameter corresponding to the outer diameter of the worm of the upper part 4b, the cylindrical wall or lip 4f providing fluidtightness and centering of the extraction device relative to its cylindrical sleeve 1a or 1b surrounding the upper part 4b of the extraction device. Thus, the lower part 4a of the extraction device bordered by the vertical wall 4c and limited in height by the ledge 4e extends below the bottom of the housing 1. The leading edge 4g of the spiral helical lower part 4a lying along a radius of the spiral is beveled to facilitate the cutting of the bulk material.

Figure 2:
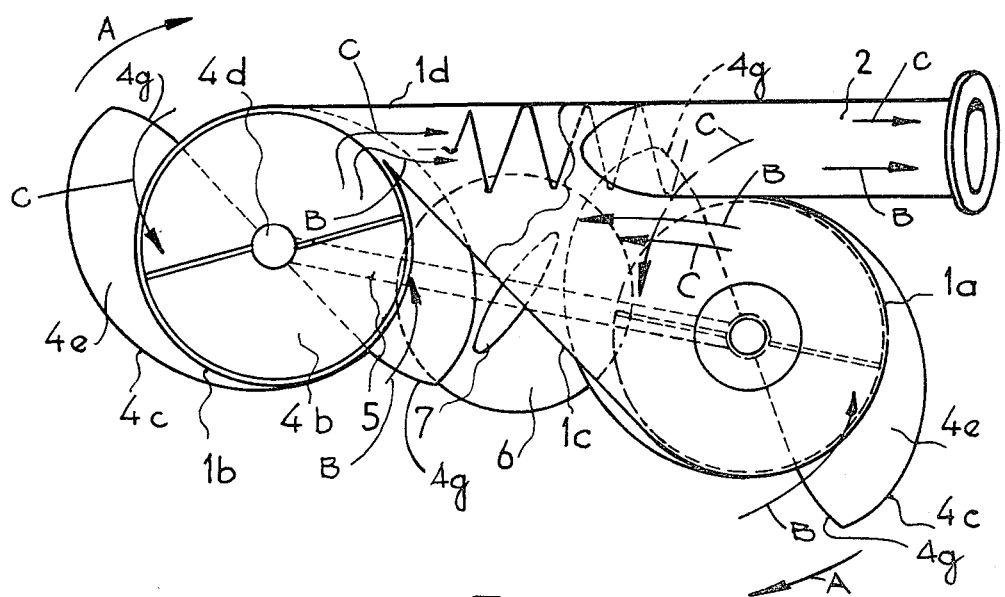
FIG. 2 is a top plan view of the apparatus illustrated in FIG. 1 with part of the upper part of the apparatus removed.
Figure 3:
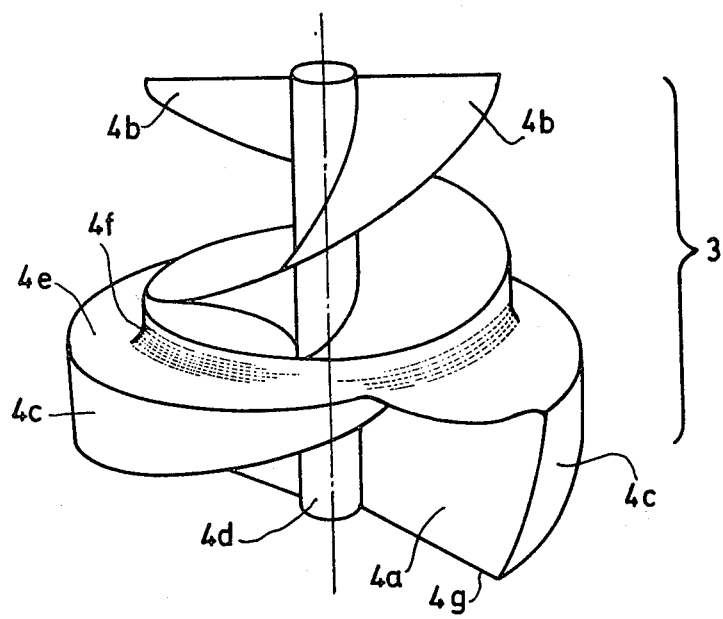
FIG. 3 is an isometric projection of the extraction device.
Figure 4:
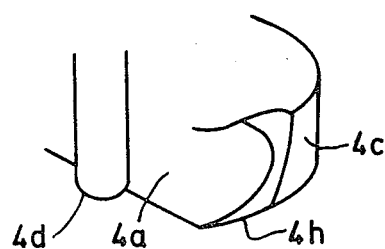
FIGS. 4 and 5 are fragmentary views similar to that of FIG. 3 illustrating two modified embodiments of the apparatus.
Figure 5:
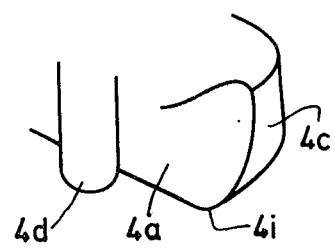

In FIGS. 1-3, the sprial helical lower part 4a of the extraction device is cut by a radial plane along a horizontal line which is joined directly to the vertical wall 4c. According to an advantageous modified embodiment illustrated in FIGS. 4 and 5, the spiral helical lower part 4a is connected to the vertical wall by an oblique or concave portion 4h, 4i which eliminates a sharp angle which is more subject to wear than an oblique or curved angle.

The extraction device is similar to a scoop or shovel: it is driven in rotation by any known means, e.g. electrical, hydraulic or pneumatic, the direction of rotation being indicated by the arrows A. Each of the spiral helical flights 4a has an oppositely directed pair of leading edges 4g which generate two streams of material, indicated by the arrows B and C, which initially move in opposite directions and are combined by the worm 4b for discharge. It should be noted that the closed conduit constituted by spiral helical flight 4a and lateral wall 4c is integral with worm 4b, the parts having a common axis of rotation defined by the central hub 4d. The speeds of rotation of the extraction and discharge devices are independent of each other and variable as a function of the nature and compactness of the bulk material to be extracted. Thus, in some cases the speed of rotation of the extraction device may be greater than that of the discharge device in order to compress the bulk material in the manifold before the discharge device taken over. The rotary shafts of the extraction devices may be interconnected at their lower ends by a cross member 5 having a detachable plate 6 at its middle for assisting the displacement and the support of the apparatus on a solid surface and permitting in-depth operation at successive levels or in successive layers.

To help the scooping of the bulk material by the leading edges of each of the extraction devices, one or more deflectors 7 may be provided, arranged obliquely with respect to the zone of revolution of the extraction device, the relative braking action caused by the deflector(s) on the bulk material pushed ahead of the leading edges, forcing it to clear the leading edges.

As disclosed and described the apparatus may be employed without associating therewith a diluting or breaking-up device.

The invention is not intended to be limited to the embodiments illustrated and described above. Thus, without deparating from the scope of the invention, the apparatus may comprise a single or more than two extraction devices, each or the extraction device may be equipped with one or more spiral helical flights.

The apparatus according to the invention may be utilized for any sort of extraction of pasty, particulate or pulverulent bulk materials. Thus, it may be employed for clearing out silt or sand, the extraction of petroleum products, handling grains or meal or any other powdery material, for extracting and handling nodules or any organic or mineral material.

What is claimed is:

1. Apparatus for simultaneous extraction of a pasty, particulate or pulverulent bulk material, with or without moisture, and transfer to an intake manifold where it is taken over for discharge to a loading or dumping station, said apparatus comprising a sheet material housing (1) defining said intake manifold for the bulk material, said housing comprising at least one cylindrical sleeve (1a or 1b) having a vertical axis, an extraction device (3) having an upper part (4b) and a lower part (4a), said upper part (4b) comprising a worm rotatably mounted in said sleeve and having a diameter corresponding to that of said sleeve, said lower part (4a) comprising at least one spiral helical flight coiled around a central hub (4d) and extending from the lower end of said sleeve, a vertical wall (4c) laterally bounding said spiral helical flight, a conduit of closed section being defined between said central hub (4d) and said vertical wall (4c) for conveying the bulk material to said upper part of said extraction device, a ledge (4e) connecting said upper and lower parts of said extraction device, the outer edge of said ledge being joined to said vertical wall, and said spiral helical flight being integral with and joined smoothly to said worm.

2. Apparatus according to claim 1, wherein said ledge (4e) is substantially horizontal.

3. Apparatus according to claim 1, wherein said ledge (4e) is of spiral helical configuration.

4. Apparatus according to claim 1, 2 or 3, wherein said ledge has an upwardly extending cylindrical lip (4f) spaced inwardly from said vertical wall (4c) said cylindrical lip providing fluidtightness between said extraction device and said sleeve and centering said extraction device relative to said sleeve.

5. Apparatus according to claim 1, wherein said conduit defined between said central hub (4d) and vertical wall (4c) protrudes below the bottom of said housing.

6. Apparatus according to claim 1, wherein said spiral helical flight is joined to said vertical wall by a curved portion (4i).

7. Apparatus according to claim 1, wherein said spiral helical flight is joined to said vertical wall by an oblique portion (4h).

8. Apparatus according to claim 1, wherein said sleeve is continued by a tangential sheet material portions (1c and 1d) for conveying while compacting bulk material to a takeover zone of said discharge device.

9. Apparatus according to claim 1, there being two said sleeves, associated with two said worms and two said extraction devices, the vertical axes of said sleeves being parallel to and spaced from each other, further comprising a cross member (5) interconnecting the lower ends of the shafts of said extraction devices said cross member comprising a detachable plate (6) for assisting the support of said apparatus on a solid surface for its operation in successive layers of bulk material.

10. Apparatus according to claim 1, further comprising at the lower part of said housing at least one deflector (7) arranged obliquely with respect to a zone of revolution of said lower part of said extraction device, the relative braking action caused by said deflector on the bulk material pushed ahead of said extraction device forcing the bulk material to clear the leading edge of said spiral helical flight.

* * * * *